United States Patent [19]

Heimburger

[11] 4,119,339
[45] Oct. 10, 1978

[54] VEHICLE UNDERCARRIAGE AIR DEFLECTOR

[76] Inventor: Arthur Sherman Heimburger, P.O. Box 246, Nashville, Ind. 47448

[21] Appl. No.: 721,975

[22] Filed: Sep. 10, 1976

[51] Int. Cl.² .............................................. B62D 35/02
[52] U.S. Cl. .................................. 296/1 S; 180/1 FV
[58] Field of Search .............. 296/1 S, 91; 180/1 FV; 105/2 R

[56] References Cited

U.S. PATENT DOCUMENTS

| 2,710,772 | 6/1955 | Schulein ................................. 296/91 |
| 3,574,392 | 4/1971 | Hirano .................................. 296/91 |
| 3,618,998 | 11/1971 | Swauger .............................. 296/1 S |

FOREIGN PATENT DOCUMENTS 2,159,636  6/1973  Fed. Rep. of Germany .......... 296/1 S Primary Examiner—John A. Pekar
Attorney, Agent, or Firm—Woodard, Weikart, Emhardt & Naughton

[57] ABSTRACT

A rectangular panel is hingedly mounted to the lower edge of the front bumper of a motor vehicle of the high road clearance variety. Mechanical hand crank means, and power driven means are disclosed for raising and lowering the panel as desired. The panel is swingable upwardly and rearwardly from the hinged mounting.

13 Claims, 7 Drawing Figures

VEHICLE UNDERCARRIAGE AIR DEFLECTOR

BACKGROUND OF THE INVENTION

1. Field of the Invention

This invention relates generally to motor vehicles, and particularly to air flow controls for deflecting air from the undercarriage of a passenger car or truck.

2. Description of the Prior Art

Various devices have been invented for use with motor vehicles to control air flow, exhaust gas flow, spray, dust, and splash; and there is even a patent showing use of fluid flow associated with the wheels to avoid hydroplaning. Other devices have been invented for controlling wind effects on the vehicle, and some have been invented for increasing wheel loading as a result of air flow effects, in order to improve steering and roadability thereof at high speeds which might otherwise cause steering problems at high speeds for smooth bottom automobiles. United States and foreign patents and an item of literature showing one or more of the aforementioned types of devices are as follows:

U.S. Pat. Nos.:
1,425,448, Carroll
1,543,877, Saunders
2,036,560, Backus
3,243,192, Franzel
3,348,873, Saunders
3,544,370, Wrede
3,618,998, Swauger
3,743,343, Grote, Sr., et al.
3,776,587, Oxlade
3,869,617, Gaussoin et al.
3,524,672, Rawlings
Foreign Patents:
British Pat. No. 443,903
French Pat. No. 1,166,479
Italy Pat. No. 560,498
Italy Pat. No. 560,594
Journal:
Commercial Car Journal, April, 1955, pp. 30, 210

In recent years, there has been increasing interest and marketing of vehicles which are operable not only on comparatively rough roads and cross country, but also at comparatively high speeds on the highway. Such vehicles typically have high road clearance with the result that a comparatively large frontal area of undercarriage is exposed to the wind during highway operation. Accordingly they have been characterized by comparatively poor fuel economy. The present invention is addressed to that problem.

SUMMARY OF THE INVENTION

Described briefly, in a typical embodiment of the present invention, an air deflector is pivotally mounted to the front of the vehicle ahead of the undercarriage and is provided with means for retracting it from a deployed position in which it is active and deflects air sidewards and downward from ahead of the undercarriage, to a retracted position where it is out of the way for driving in areas where there is the possibility of interference with road hazards such as curbs, rocks, or simply the high crown in the center of a country road. Powered and manual means may be employed for movement of the air deflector between its active and passive positions.

DESCRIPTION OF THE PREFERRED EMBODIMENT

Figure 1:
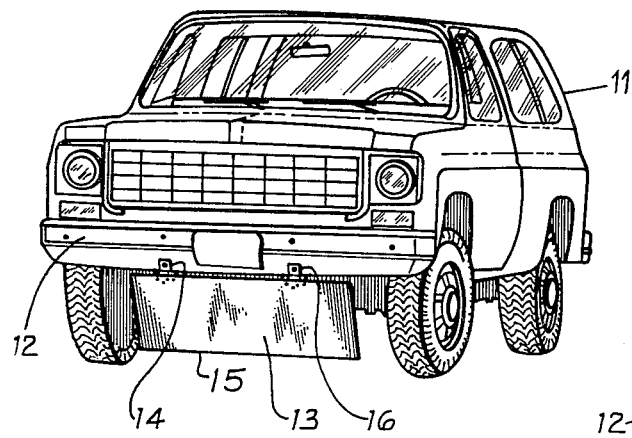
FIG. 1 is a front perspective view of a high road clearance type of passenger vehicle having the air deflector thereon deployed in its active position according to a typical embodiment of the present invention.
Figure 2:
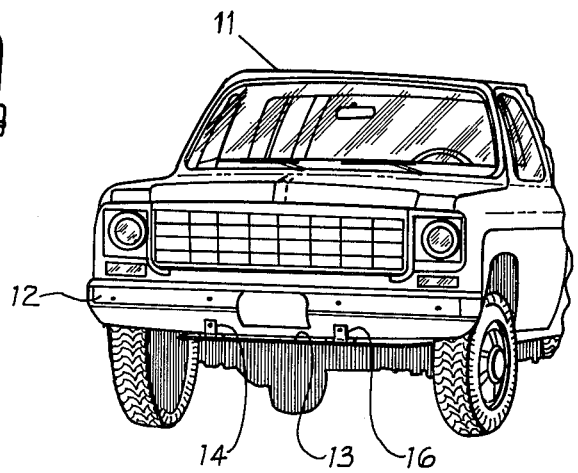
FIG. 2 is a fragmentary view similar to FIG. 1, but showing the air deflector retracted to its passive position.

Referring now to the drawings in detail, and particularly FIG. 1, the passenger automobile 11 of the carryall type has a front bumper 12 with the air deflector 13 hinged to the bottom edge thereof at 14 and 16 and shown in the fully deployed active position. FIG. 2 shows the air deflector retracted so as to avoid curbs or other road hazards which are not ordinarily encountered on the high speed highway, but can be frequently encountered in city, country road, or cross country driving.

Figure 3:
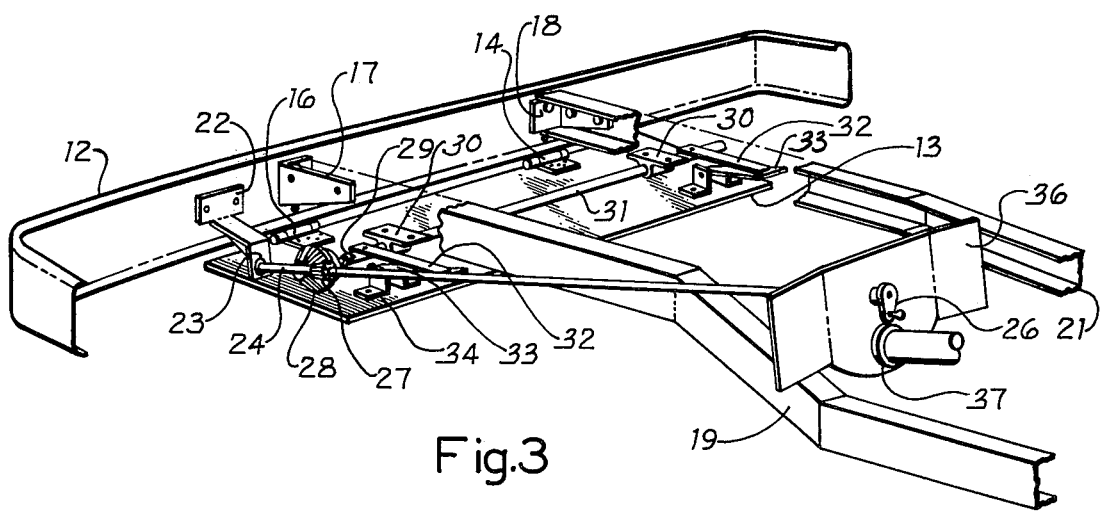
FIG. 3 is a perspective view of the air deflector retracted as seen from the rear and on a larger scale than in FIGS. 1 and 2, and with the major portion of the vehicle omitted in order to show the construction and mounting details to the bottom of the front bumper.
Figure 4:
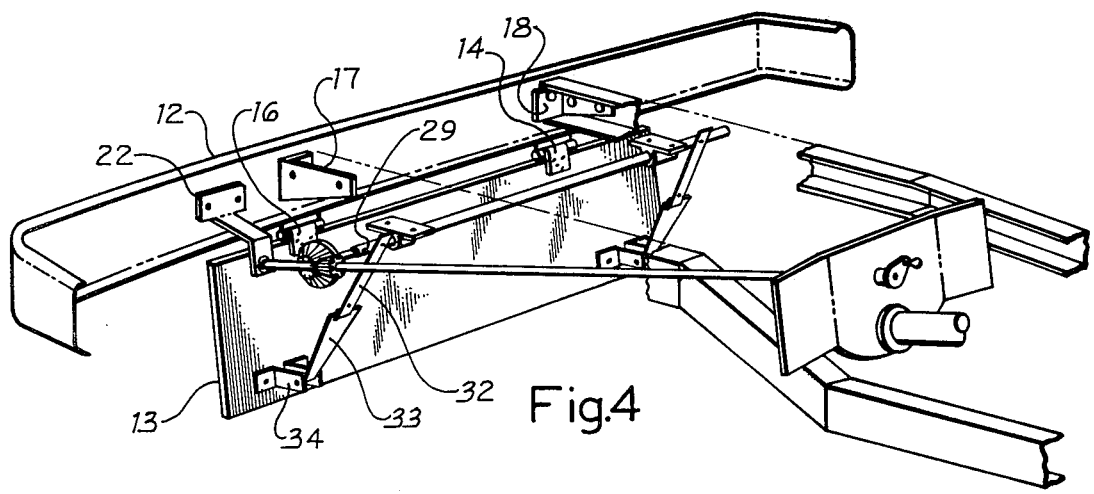
FIG. 4 is a view similar to FIG. 3 but showing the unit in the active position.

As shown in FIG. 3, the front bumper 12 is mounted at the front ends of the left and right front bumper mounts 17 and 18 which are connected by suitable means to the front ends of the left and right frame side members 19 and 21, respectively. The bumper mounting means and bumper itself may be entirely conventional; and one of the important advantages of the present invention is the fact that it can be employed on a very conventional vehicle.

A drive shaft bracket 22 is mounted to the front bumper and has a bearing 23 at the lower end thereof receiving the front end of the deflector panel operating shaft 24. The shaft has a hand crank 26 at the rear end thereof which can be located in the passenger compartment within easy access to the driver. The shaft has a pinion 27 thereon engaging gear 28 connected through a shear pin 29 to the rock shaft 31 which may be mounted in pillow blocks 30 fastened to the bottoms of members 19. Panel operating arms 32 connected to the shaft 31 have links 33 connecting them to panel brackets 34 secured to the panel itself. Accordingly, rotation of the hand crank 26 in one direction by the driver sitting in the front seat of the car, will be effective to raise the panel, and rotation of the hand crank in the opposite direction by the driver of the car will be effective to lower the panel. The hand crank may project directly out of the instrument panel 36 adjacent the steering column 37 for convenience.

Figure 5:
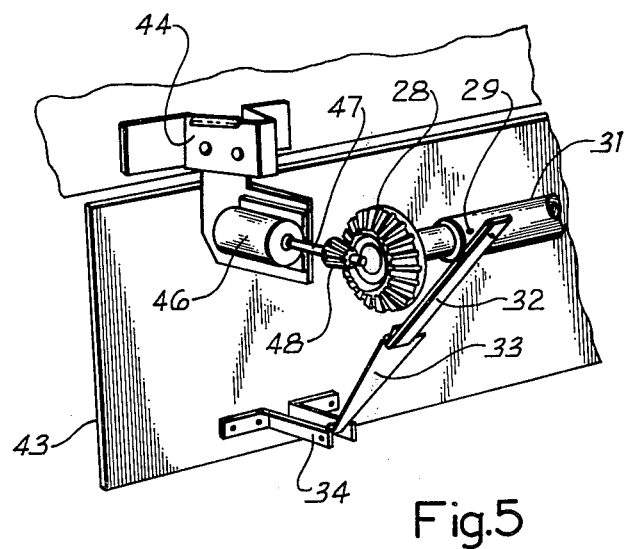
FIG. 5 is a view similar to FIG. 4 but showing a motor drive instead of a hand crank drive for the air deflector.

FIG. 5 is an enlarged fragmentary view of the embodiment of the deflector panel 43 wherein a bracket 44 is mounted to the bumper and supports an electric motor 46 having a drive shaft 47 with a pinion 48 thereon driving the gear 28 connected through a suitable shear pin to the rock shaft 31 for operating the deflector 43.

The air deflection device is intended to direct the flow of air away from the undercarriage of the vehicle. It can be adjusted to various angles between the fully active deployed position in which it is vertical up and down, and the retracted passive position in which it is substantially horizontal. It can be adjusted to any angle between the fully up and fully down position depending upon the speeds and road conditions expected. The shear pin is provided as a safety measure so that in the event that an obstruction in the path of the vehicle is hit by the panel, the shear pin will be broken and the panel deflected upwardly without destruction of any of the components other than the shear pin. Means other than a shear pin could be employed to serve this purpose.

The objective being to force air flow downward and outward away from the underside of the vehicle, and the means employed for accomplishing this objective being readily adaptable to various types of vehicles, it should be recognized that it can be mounted on trucks as well as on passenger cars and can prove quite beneficial on any vehicle having comparatively high road clearance such as to expose fairly large frontal areas of undercarriage to the wind at highway speeds. It is not intended that the deflector be swung forward to a position such as to cause the wind to be deflected upward and thereby tend to cause increased loading of the front end of the vehicle.

It should be recognized that in addition to the hand crank or the electric motor or both, for operating the deflector, hydraulic actuators or other means might also be used. In addition to reduction of turbulence and drag due to vehicle undercarriage, the invention can also considerably reduce spray when the vehicle is traveling over wet pavement. Spray reduction can be of considerable assistance and thereby a safety benefit to a motorist following the type of vehicle for which the present invention is intended primarily, as such passenger vehicles with high road clearance are not normally equipped with mud flaps.

Figure 6:
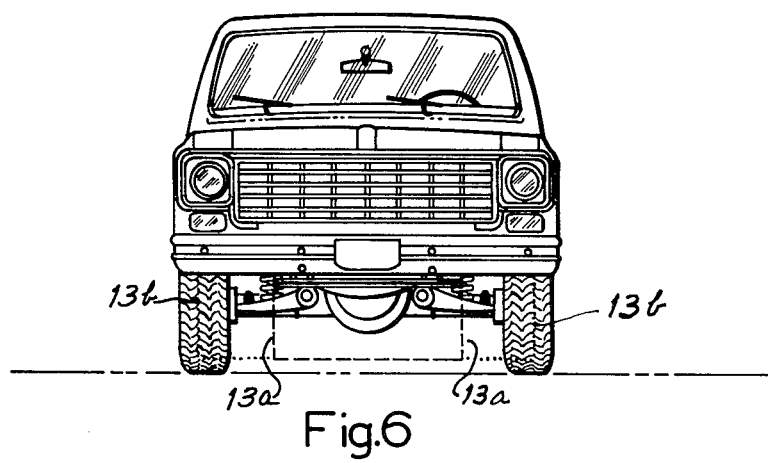
FIG. 6 is a front view of the vehicle with the deflector in its passive position, but showing it fully deployed in two possible widths in dotted and dashed lines.
Figure 7:
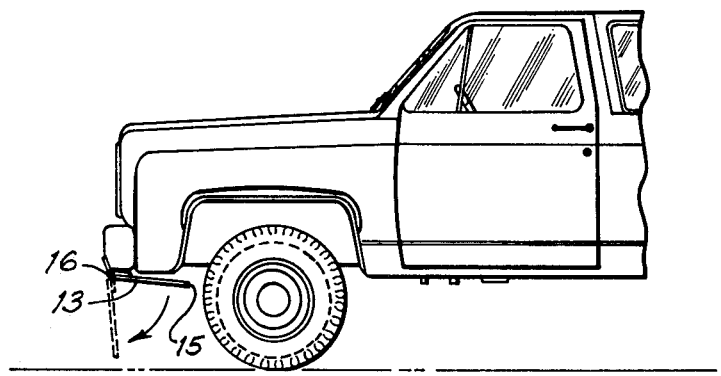
FIG. 7 is a side view thereof.

The illustrated panel is of size such that as shown in the dashed lines 13a in FIG. 6, the ends are inside the boundaries determined by the inside edges of the front tires steered to the limit left and right, for clearance when the panel is retracted. The bottom edge 15 of the deployed panel as in FIG. 1 is about 5 inches above the road surface. In vehicles where the distance from the hinge axis to the bottom edge of the panel is less than the distance from the hinge axis to the front tires, as shown in FIG. 7, the panel can be wide enough to extend in front of the front tires as shown in dotted lines 13b by the wider version of the panel in FIG. 6. For best results, the deployed panel should extend below the level of the undercarriage. The closer the lower edge is to the road, the better the result that is expected, except that a clearance of less than 2 or 3 inches may be too little, even for highway driving, if encounters with stones or other road debris are to be avoided.

What is claimed is:

1. An undercarriage air deflector apparatus comprising:
    an elongated panel having hinge means along a marginal edge thereof adapted to attachment to a lower portion of a vehicle ahead of a vehicle front wheel suspension member;
    first bracket means connectable to the lower portion of the vehicle ahead of a front wheel suspension member and having bearing means therein;
    drive shaft means supported in said bearing means and having a drive pinion thereon;
    second bracket means connectable to the lower portion of the vehicle ahead of a vehicle front wheel suspension member;
    rocker shaft means mounted in said second bracket means and including a rocker shaft extending parallel to said panel;
    operating arm means connected to said rocker shaft means and to said panel for pivoting said panel about said hinge means as said rocker shaft means is turned; and
    a drive gear on said rocker shaft means engaged by said pinion and thereby operable upon rotation of said drive shaft means to turn said rocker shaft means for pivoting said panel about said hinge means.

2. The apparatus of claim 1 wherein:
    said drive shaft means include an electric motor output shaft.

3. The apparatus of claim 1 wherein:
    said drive shaft means include a hand crankshaft.

4. The apparatus of claim 1 wherein:
    said rocker shaft means include a shear pin shearable upon turning of said rocker shaft means independent of said drive gear.

5. The apparatus of claim 1 wherein:
    said operating arm means include at least two arms transversely affixed to said shaft in locations spaced longitudinally along said shaft, and at least two links, each link having one end pivotally connected to one of said arms at a location remote from the rocker shaft axis and the other end pivotally connected to said panel remote from said hinge means.

6. The apparatus of claim 1 and further comprising:
    said motor vehicle having front wheels and rear wheels and frame means supported by said wheels and a passenger compartment supported by said frame means,
    said hinge means being connected to said frame means ahead of said front wheels, and said panel being pivotally operable about the axis of said hinge means between an active, substantially vertical air-deflecting attitude, and a passive, substantially horizontal attitude, by rotation of said drive shaft means.

7. The apparatus of claim 6 wherein, when said panel is in said active attitude, said hinge means are along an upper marginal edge of said panel, and said arm means are connected to the rear of said panel below said hinge means whereby said panel is pivotable upwardly and rearwardly from said active attitude toward said front wheels.

8. The apparatus of claim 6 wherein said drive shaft means has a handcrank portion thereon in said passenger compartment.

9. In a motor vehicle having a body with a passenger compartment therein, an underside and front and rear wheels for rolling on a road surface and supporting the body, and undercarriage having portions connecting the front wheels to the body, the improvement comprising:
    an air deflector mounted to a lower portion of said body ahead of said front wheels and having a retracted position and a deployed position, and having a first portion and a second portion and having hinge means connecting said first portion thereof to said body;

said deflector being oriented in said retracted position to extend generally parallel to the underside of said body from a beginning at said first portion rearward to an end at said second portion and thereby exposing said undercarriage to headwinds;

and actuator means connected to said deflector and to said body and operable, when actuated, to swing said second portion downward from said body and forward to said deployed position wherein said deflector extends non-paralel to the underside of said body and in front of said undercarriage for deflecting the air downwardly and outwardly and thereby shielding said undercarriage from headwinds.

10. The improvement of claim 9 wherein:

said actuator means include manually operable drive means extending from inside said passenger compartment to said deflector for swinging the deflector between said positions for adjusting the degree of deployment of said deflector.

11. The improvement of claim 9 wherein:

said actuator means includes power drive means mounted to said body and coupled to said deflector for driving the deflector between said positions for adjusting the degree of deployment of said deflector.

12. The improvement of claim 9 wherein:

said body includes a front bumper having a top and bottom, and said deflector is a panel and said hinge means is connected to said bottom of the bumper and to said first portion of said deflector, said first portion being a marginal portion of said panel, whereby said panel is hinged to the bottom of said front bumper.

13. The improvement of claim 12 and further comprising:

first bracket means mounted to said body behind said bumper;

second bracket means mounted to said body behind said bumper;

said actuator means including a panel operating shaft mounted in said second bracket means parallel to said panel and having panel operating arm means connected to said shaft and extending forward from said shaft and connected to said panel;

and said actuator means further including operating shaft drive means mounted to said first bracket means and coupled to said operating shaft to drive said operating shaft.

* * * * *